United States Patent [19]

Satoh

[11] 4,279,193
[45] Jul. 21, 1981

[54] TANDEM TYPE POWER SERVO BOOSTER

[75] Inventor: Satoru Satoh, Matsuyama, Japan

[73] Assignee: Jidosha Kiki Co., Ltd., Tokyo, Japan

[21] Appl. No.: 26,967

[22] Filed: Apr. 4, 1979

[30] Foreign Application Priority Data

Jul. 18, 1978 [JP] Japan .................................. 53-87253

[51] Int. Cl.³ .......................... F01B 19/00; F15B 9/10
[52] U.S. Cl. ..................................... 91/376 R; 92/48
[58] Field of Search ................... 92/48, 49; 91/369 A, 91/369 B, 369 R, 376 R

[56] References Cited

U.S. PATENT DOCUMENTS

| 3,096,689 | 7/1963 | Kytta ........................................ 92/48 |
| 3,103,855 | 9/1963 | Hager et al. ............................. 92/48 |
| 3,152,518 | 10/1964 | Ayers, Jr. ................................. 92/49 |
| 3,958,497 | 5/1976 | Gardner et al. ......................... 92/48 |

Primary Examiner—Paul E. Maslousky
Attorney, Agent, or Firm—Sughrue, Rothwell, Mion, Zinn and Macpeak

[57] ABSTRACT

A tandem type power servo booster including a housing having front and rear shells with front and rear pistons within the housing. The rear piston is coupled to a valve and an inner cylindrical member extends from the valve with the front piston secured to it. A push rod is inserted into the cylindrical member and a bias spring is also disposed therein. The front piston and the cylindrical member are formed from pressed metal and the inner diameter of the cylindrical member is larger than an outer diameter of the recessed portion.

9 Claims, 2 Drawing Figures

TANDEM TYPE POWER SERVO BOOSTER

BACKGROUND OF THE INVENTION

This invention relates to a tandem type power servo of the fluid differential pressure actuated type having two power pistons connected in series, and more particularly, to a type thereof, wherein axial length is minimized to provide a compact and economical device, aligning the central shafts.

As shown in U.S. Pat. No. 3,083,698, a tandem type power booster generally comprises a tandem piston, having front and rear power pistons 18, 20, a cylindrical member C connected to a valve body E, a push rod F having one end inserted into the cylindrical member to provide sliding contact with the valve body and the other end projected out from a cylindrical recess of a front shell 10. The front power piston 20 is secured to the cylindrical member and the rear power piston 18 is secured to the valve body. The other end of the push rod is sealingly supported by a sealing member accommodated in the cylindrical recess.

In the conventional apparatus, generally, the cylindrical member and the front power piston are made of synthetic resin and the frontward movement of the tandem piston is stopped by the abutting contact between the rear planar end surface of the cylindrical recess and frontward surface of the front power piston or front planar end of a cylindrical member inwardly extending from the front shell.

However, the thickness of the pistons and the cylindrical member is generally large in light of the mechanical strength due to the materials thereof, and further, restriction of the frontward movement of the tandem piston results from the abutting contact, so that the inwardly extended length of the cylindrical recess causes the overall device to be axially long. Therefore, a compact device is not readily obtainable.

SUMMARY OF THE INVENTION

It is therefore an object of this invention to overcome the above-mentioned drawbacks and to provide an improved tandem type power servo booster having a small axial length for easy installation in an engine compartment of a vehicle.

This object is attained in accordance with the present invention by the embodiment of the metal power piston and the cylindrical member subject to pressing. Further the inner diameter of the cylindrical member is larger than the outer diameter of the cylindrical recess inwardly extending from the front shell, to insert the cylindrical recess into the cylindrical member, during frontward movement of the power piston. Hence, the axial length of the entire booster is reduced, to provide a compact and economical booster.

These and other objects of this invention will become apparent from the description of the drawings and the preferred embodiments which follow.

DETAILED DESCRIPTION OF THE PREFERRED EMBODIMENTS

Figure 1:
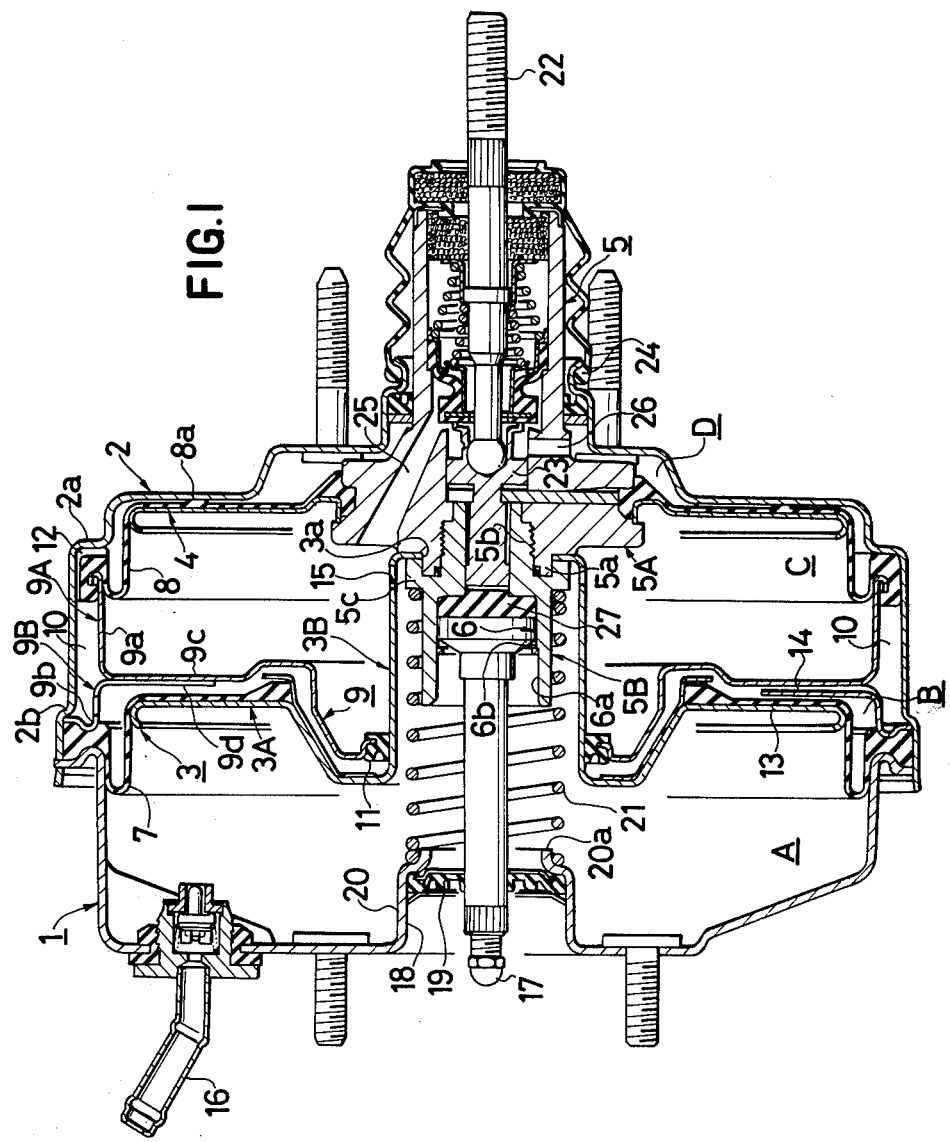
FIG. 1 is a cross-sectional view of tandem type power servo booster according to a first embodiment of this invention.

A first embodiment according to this invention is shown in FIG. 1, wherein front and rear power pistons 3, 4 are arranged in tandem in a housing defined by front and rear shells 1, 2. The front and rear power tandem pistons 3, 4 are pressed metal products, formed from flat sheets. The front power piston 3 is provided with a disc-like piston portion 3A and a central cylindrical portion 3B integral therewith. The cylindrical portion 3B corresponds to the cylindrical member as above mentioned in describing the prior art.

Reference numeral 5 designates a valve body provided with a main body 5A and a support member 5B threadingly engaged therewith. The front end of the main body 5A is formed with an annular projection 5a and the rear end portion of the support member 5B is formed with a threaded portion 5b adapted to threadingly engaged with a female thread formed in the main body. An annular support 5c is adapted to cover the projection 5a.

The rear end of the cylindrical portion 3B of the front power piston 3 is bent to provide a hole 3a whose inner diameter is coincident with the outer diameter of the annular projection 5a to fit therewith. The bent portion is fixedly secured between the rear planar end surface of the annular support 5c and the main body 5A, by the threading engagement between the main body 5A and the support member 5B. Therefore, linear alignment is achieved between axial centers of the valve body 5 and the front power piston 3. Also, the front power piston 3 is fixedly secured to the valve body 5.

The rear power piston 4 is fixedly secured to an outer peripheral surface of the main body 5A of the valve body 5. The support member 5B has an inner stepped wall 6, with the larger diameter piston 6a having an inner peripheral surface formed in a polygonal shape to permit easy threading engagement of the support member 5B with the main body 5A. Alternatively, the front planar end surface of the support member 5B is formed with slits adapted to receive a screw driver or the like.

Reference numerals 7, 8 designate front and rear diaphragms adapted to divide the housing into pressure chambers together with the front and rear power pistons 3 and 4. Additionally a center plate 9 is disposed between the front and rear power pistons 3, 4 to thus provide four pressure chambers A, B, C and D. The center plate 9 comprises two cylindrical members 9A, 9B, both being pressed products and each formed with outer sleeves 9a, 9b and partition walls 9c, 9d, respectively. An outer diameter of the sleeve 9a of the cylindrical member 9A is smaller than the inner diameter of the rear shell 2 to provide an annular passage 10 therebetween. The rear end portion of the cylindrical member 9A fixes the outer peripheral end portion of the rear diaphragm 8. The partition wall 9c has a central hole which secures sealing member 11 mounted on the outer peripheral surface of the cylindrical portion 3B to sealingly maintain pressure chambers B and C.

In this case, the outer peripheral end portion of the rear diaphragm 8 has a suitable thickness to facilitate a concentric arrangement between the rear shell 2 and the cylindrical member 9A when the peripheral end portion of the diaphragm 8 is force-fitted into position. Further, the peripheral portion of the diaphragm 8 contacts a stepped portion 2a of the rear shell 2. The peripheral end portion of the diaphragm is formed with a plurality of grooves 12 at its surface confronting with the inner peripheral surface of the rear shell 2 and the stepped portion 2a in order to permit fluid communication between the annular passage 10 and the pressure chamber D.

On the other hand, the outer diameter of the outer sleeve 9b of the cylindrical member 9B is slightly smaller than the inner diameter of the rear shell 2. The front end of the outer sleeve 9b is radially outwardly bent to abut with an annular stepped portion 2b formed in the rear shell 2, and the rear end of the front shell 1 is radially outwardly bent. With this structure, the outer peripheral end portion of the front diaphragm 7 is secured between the bent portions of the front shells and outer sleeve 9b, and the rear shell 2.

The partition wall 9d of the cylindrical member 9B is formed with radially arranged reinforcing ribs 13 each bulging toward the pressure chamber B. Surface engagement between the partition walls 9c and 9d is achieved, for example, by spot welding, and spaces defined between the inner peripheral surfaces of each of the ribs 13 and the partition wall 9c provide fluid passages 14 to permit fluid communication between the annular passage 10 and the pressure chamber B. Therefore, the pressure chamber D is in fluid communication with the pressure chamber B through passages 12, 10 and 14 and through a space between the rear shell 2 and the rear diaphragm 8. The space is provided by a plurality of projections 8a rearwardly extending from the rear diaphragm 8 so as to avoid complete surface engagement between the rear diaphragm 8 and the rear shell 2. On the other hand, the pressure chamber A is in fluid communication with the pressure chamber C through a perforation 15 formed in the cylindrical portion 3B.

Reference numeral 16 designates a port opened to the pressure chamber A for introducing negative pressure in the pressure chambers. The port is connected to an intake manifold or a vacuum pump (not shown) of a vehicle engine.

A push rod 17 is provided having a rear portion inserted into the cylindrical portion 3B and being in sliding contact with an inner peripheral surface of an intermediate diameter portion 6b of the support member 5B, and having the front portion inserted into a cylindrical recess 18 inwardly extended from the front shell 1. The front portion of the push rod extends to the outside of the device and is sealingly maintained by a sealing member 19 positioned in the cylindrical recess 18. The cylindrical recess 18 provides an inwardly extending projection 20. In the conventional booster, a planar end surface 20a of the projection 20 abuts on the front surface of the front power piston 3, to regulate the advancing position of the front and rear power pistons and the valve body 5. Therefore, the axial length of the projection 20 causes the booster to be axially long.

According to this invention, however, the inner diameter of the cylindrical portion 3B is larger than the outer diameter of the projection 20, so that the projection 20 can be inserted into the cylindrical portion 3B. Furthermore, according to this invention, rear end portion 20a of the projection 20 is radially inwardly bent to secure one end of a return spring 21, the other end of which is supported by the support member 5B of the valve body 5, to urge the front power piston 3 away from the front shell 1. The end portion 20a also functions as a stopper face adapted to abut against the front planar end surface of the support member 5B to regulate frontward movement of the power pistons. Of course, upon abutment of the end portion 20a on the support member 5B, the frontward portion 3 of the front power piston 3 does not abut against the front shell 1.

The front end of the push rod 17 is connected to a master cylinder (not shown) and an operating rod 22 inserted into the valve body 5 is connected to a brake-foot pedal. Reference numeral 23 designates a valve plunger disposed in front of the operating rod 22. As is well known, a valve mechanism 24 including the plunger 23 selectively opens a passage 25 communicating with the pressure chamber C and a passage 26 communicating with the pressure chamber D, in response to the axial displacement of the operating rod 22.

Reference numeral 27 designates a resilient reaction disc interposed between the plunger 23 and the push rod 17 and positioned in the support member 5B. Therefore, the reaction force of the brake is transmitted to the brake-foot pedal through push rod 17, resilient reaction disc 27, plunger 23 and the operating rod 22.

With this structure, if the brake-foot pedal is not stepped on by a driver's foot, (if no displacement of the operating rod 22 occurs) the valve mechanism 24 permits fluid communication between the passages 25 and 26, to allow fluid communication between the pressure chambers C and D, so that, all pressure chambers A, B, C and D are maintained at equal pressure. The power pistons 3 and 4 are not displaced.

On the other hand, if the operating rod 22 is displaced leftwardly in FIG. 1, the valve mechanism 24 blocks the fluid communication between the passages 25 and 26, to block fluid communication between the pressure chambers C and D, and atmospheric pressure is introduced into the pressure chamber D. As mentioned above, since the pressure chamber C is in fluid communication with the pressure chamber A through the perforation 15 in the cylindrical portion 3B, and since the pressure chamber D is in fluid communication with the pressure chamber B through passages 12, 10, 14, the atmospheric pressure is applied to the chambers B and D. The vacuum is applied to the chambers A and C through vacuum port 16, to thus provide the pressure differential between the chambers A, C and B, D. Hence, the power pistons 3, 4 are urged toward left in FIG. 1 against the biasing force of the spring 21. Upon the displacement of the front and rear power pistons 3, 4, the push rod 17 actuates the master cylinder to perform the braking opration.

In the case of the displacement of the power pistons 3, 4, since the projection 20 is inserted into the cylindrical portion 3B, the displacement of the pistons is prevented by the abutting engagement between the end portion 20a and the support member 5B. Since the front power piston and the cylindrical portion 3B are metal pressed products, the overall axial length of the booster can be minimized yet still enable an effective stroke of the power pistons.

Figure 2:
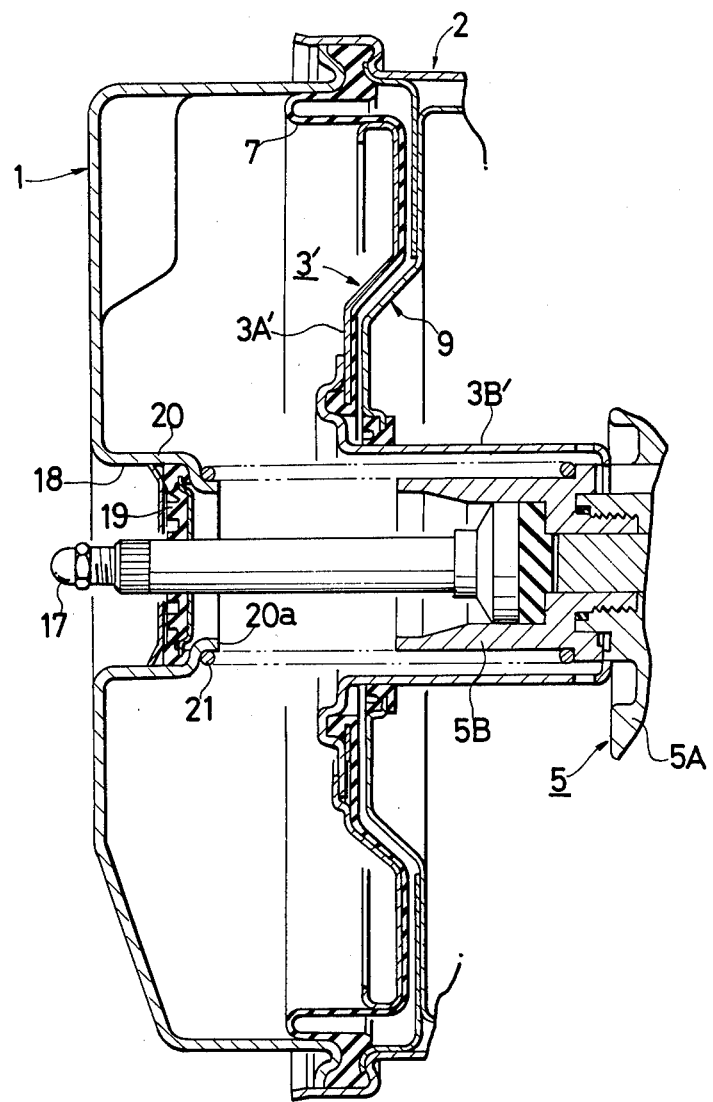
FIG. 2 is a cross-sectional view of tandem type power servo booster showing the essential parts according to a second embodiment of this invention.

A second embodiment according to this invention is shown in FIG. 2, wherein like parts and components are designated by the same reference numerals and chacters as those shown in the first embodiment. In the second embodiment, a piston portion 3A' of the front power piston 3' is made of a pressed metal product independent of a cylindrical portion 3B' made also of a pressed metal product, and the piston portion 3A' and the cylindrical portion 3B' are connected with each other by, for example, spot welding.

While the invention has been described in detail and with reference to specific embodiments thereof it will be apparent to one skilled in the art that various changes and modifications can be made therein without departing from the spirit and scope thereof.

What is claimed is:

1. In a tandem type power servo booster including a housing defined by front and rear shells, a rear power piston secured to a valve body, a cylindrical member extending from the valve body, a front power piston secured to the cylindrical member, and a push rod having a rear end inserted into the cylindrical member and slidingly contacted with the valve body, and a front end projecting outside the housing through a recessed portion formed in the front shell, said recess accommodating a sealing member to seal said front end of said push rod, the improvement comprising:

the front power piston and the cylindrical member being formed of sheet metal, and an inner diameter of the cylindrical member being larger than an outer diameter of the recessed portion, to insert the recessed portion into the cylindrical member; and wherein the valve body comprises a main body and a support member threadingly engaged and in alignment therewith, a rear end portion of the cylindrical member engaging a projection provided on said main body to maintain a concentric arrangement between the cylindrical member and the valve body, said cylindrical member being fixedly supported between the main body and the support member.

2. The improvement of claim 1, wherein said front power piston is integral with said cylindrical member.

3. The improvement of claim 2 further comprising a force transmitting member interposed between said push rod and said valve body.

4. The improvement of claim 2 further comprising return spring means abutting said recessed portion of said front shell and extending inside said cylindrical member.

5. The improvement of claim 4 wherein said return spring means abuts said support member.

6. The improvement of claim 5 further comprising a force transmitting member interposed between said push rod and said valve body.

7. The improvement of claim 1 further comprising return spring means abutting said recessed portion of said front shell and extending inside said cylindrical member.

8. The improvement of claim 1 further comprising means to bias said push rod in one direction, said means to bias extending inside said cylindrical member.

9. The improvement of claim 8 wherein said means to bias comprises a return spring, having one end abutting said recessed portion and the other end abutting said valve body.

* * * * *